United States Patent [19]
Holt

[11] Patent Number: 5,189,710
[45] Date of Patent: Feb. 23, 1993

[54] METHOD AND AN APPARATUS FOR GENERATING A VIDEO BINARY SIGNAL FOR A VIDEO IMAGE HAVING A MATRIX OF PIXELS

[75] Inventor: Kenneth C. Holt, Berkeley, Calif.

[73] Assignee: Teknekron Communications Systems, Inc., Berkeley, Calif.

[21] Appl. No.: 583,444

[22] Filed: Sep. 17, 1990

[51] Int. Cl.$^5$ .............................................. G06K 9/48
[52] U.S. Cl. ....................................... 382/22; 382/50; 382/52
[58] Field of Search ................. 382/22, 50, 52; 358/99

[56] References Cited

U.S. PATENT DOCUMENTS

| | | | |
|---|---|---|---|
| 4,501,018 | 2/1985 | Persoon et al. | 382/22 |
| 4,550,435 | 10/1985 | Hayman | 382/52 |
| 4,688,175 | 8/1987 | Kaneko et al. | 378/99 |
| 4,910,786 | 3/1990 | Eichel | 382/22 |
| 4,969,202 | 11/1990 | Groezinger | 382/22 |

*Primary Examiner*—David K. Moore
*Attorney, Agent, or Firm*—Limbach & Limbach

[57] ABSTRACT

In the present invention, a method and an apparatus for dynamically setting a discrimination threshold for the processing of an image is disclosed. The image is composed of a matrix of pixels with each pixel having a grey scale value. The pixels are arranged in a plurality of lines with each line having a plurality of pixels. The plurality of pixels are supplied to a line buffers memory. From the line buffers memory, the white peak line and the black minimum line are supplied to a peak and minimum detectors which determine the white peak value and the black minimum value associated with an edge. The white peak value and the black minimum values are stored. The stored white peak and black minimum values are supplied to a threshold calculator to which a user selectable input is also supplied. The output of a threshold calculator is a threshold level which is used by comparator. Another input to the comparator is the grey scale value of the pixel from the image. The output of the comparator is a binary video signal.

19 Claims, 9 Drawing Sheets

THRESHOLD CALCULATOR WITH DITHER/HALFTONE

| 75 | 45 | 65 |
| 50 | 60 | 35 |
| 55 | 40 | 70 |

FIG. 5e-2

METHOD AND AN APPARATUS FOR GENERATING A VIDEO BINARY SIGNAL FOR A VIDEO IMAGE HAVING A MATRIX OF PIXELS

TECHNICAL FIELD

The present invention relates to a method and an apparatus for dynamically setting a discrimination threshold for the processing of an image which is composed of a matrix of pixels with each having a grey value. More particularly, in the present invention, the method and apparatus relates to the setting of a discrimination threshold for background processing based upon the detection of an edge and based upon a user input.

BACKGROUND OF THE INVENTION

Methods and apparatuses for generating a video binary signal for a video image having a matrix of pixels with each pixel having a grey scale value are well known in the art. See, for example, U.S. Pat. Nos. 4,817,174; 4,791,676; 4,789,933; 4,760,5541; 4,672,463; 4,517,607; 4,630,307; and 4,498,104.

There are two prior art techniques for setting the discrimination threshold, based upon background processing and foreground processing. In background processing, where the pixel of interest is not near an area of the image having great contrast, such as an edge, the setting of the threshold has been based upon the threshold being a fixed value. In foreground processing, where the edge of an image can be clearly found, the threshold is set dependent upon the grey scale value of the pixels surrounding the pixel of interest. This is called a high frequency operator and is typified by U.S. Pat. No. 4,501,016.

In foreground processing, the threshold is dynamically set and is dependent upon the grey scale value of the pixels surrounding the pixel of interest. In the device disclosed in U.S. Pat. No. 4,501,016, a pixel of interest is compared to a threshold value which is defined as the average of highest and the darkest of the pixels in an array of pixels immediately surrounding the pixel of interest. See, for example, column 5, lines 33-36. Necessarily, this means that the threshold is calculated for each pixel of interest. Furthermore, if the calculator is unable to discern the highest and the lowest values, i.e. the pixels are of an imaging area which is essentially constant grey values, the threshold cannot be used because it is too "noisy". Thus, it can be used only in foreground processing applications.

Thus, there is a need in the prior art wherein for background processing, the threshold can be dynamically set yet, yet does not require an extensive amount of computation.

SUMMARY OF THE INVENTION

In the present invention, an apparatus for setting dynamically the discrimination threshold for the processing of an image which is composed of a plurality of pixels is disclosed. Each pixel has a grey scale value. The apparatus has means to receive a plurality of the pixels. The apparatus has means for determining the grey value of the pixels having the maximum grey value among the plurality of pixels received. Means for storing the maximum grey value determined is also provided. Means for determining the grey value of the pixel having the minimum grey value among the plurality of pixels received is also provided. Means for storing the minimum grey value determined is also disclosed. The apparatus also comprises means for setting a grey scale threshold based upon the stored minimum grey value and the stored maximum grey value. Finally, the apparatus provides a means for comparing the grey value of each pixel of the image to the grey scale threshold to produce a video binary signal.

A method for generating a video binary signal for a video image having a matrix of pixels is also disclosed.

BRIEF DESCRIPTION OF THE DRAWINGS

FIG. 5($a$-$c$) are detailed schematic diagrams of one embodiment of the White Maximum Follower Circuit, Black Minimum Follower Circuit, and Maximum and Minimum Detector Circuits, respectively shown in FIG. 1.

FIG. 5($d$)(1-2) are two embodiments of the Threshold Calculator Circuit, shown in FIG. 1.

FIG. 5($e$) is an embodiment of the Threshold Calculator Circuit with dither capability.

DETAILED DESCRIPTION OF THE DRAWINGS

Figure 1:
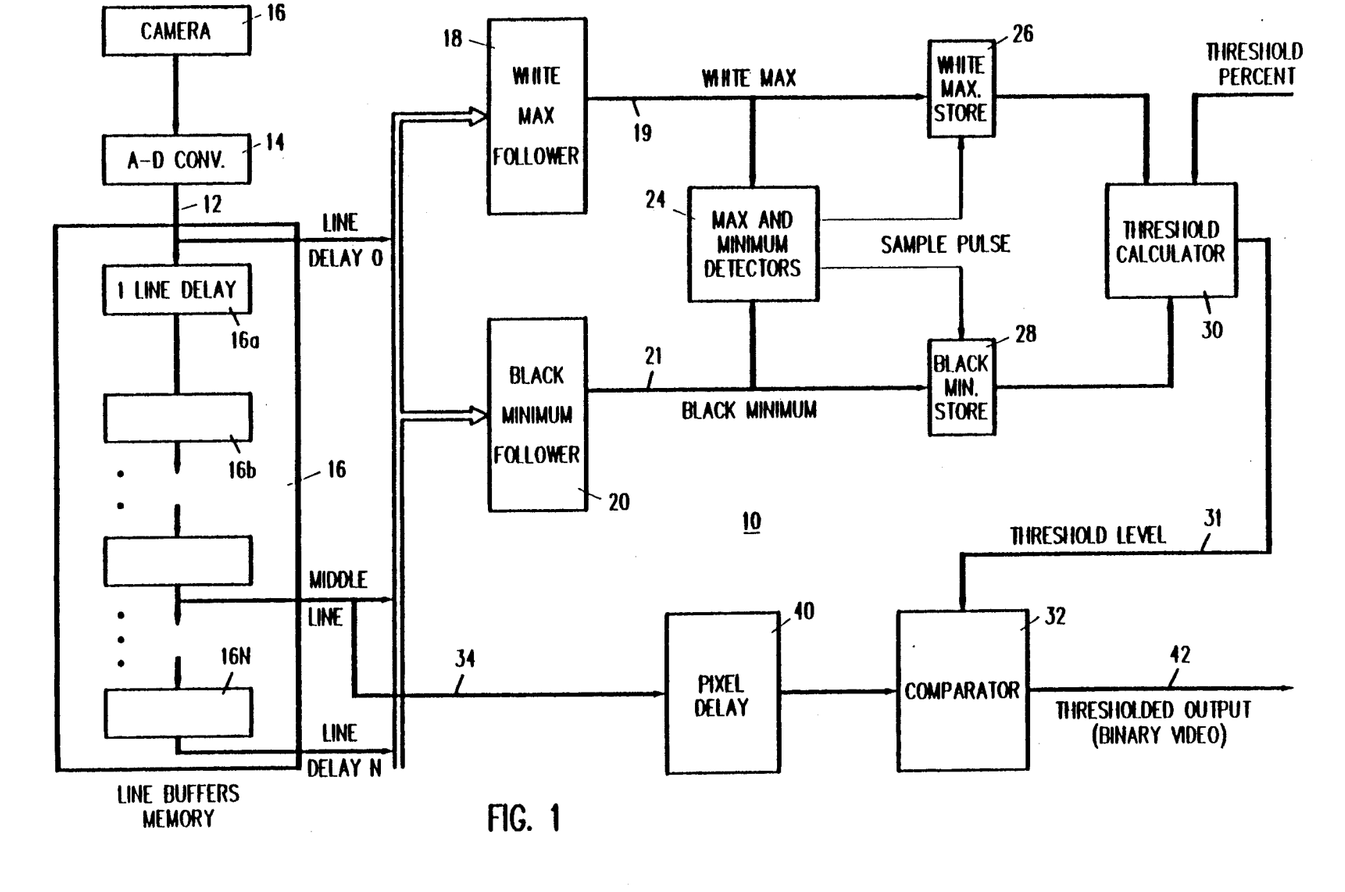
FIG. 1 is a schematic diagram of one embodiment of the apparatus of the present invention.

Referring to FIG. 1 there is shown a block diagram of the apparatus 10 of the present invention. The apparatus 10 receives a plurality of pixels from an input line 12. Each of the pixels is a digitized signal having a grey value. The plurality of pixels are arranged in a plurality of lines with each line containing a plurality pixels. The pixels can be from an A to D converter 14 which digitizes an analog signal from a camera 16. Although the apparatus 10 in FIG. 1 is shown as receiving the pixels from a camera 16, as will be seen, the apparatus 10 of the present invention can be used with any source of digitized image data with grey scale value.

The pixel data from the incoming line 12 is stored a line at a time in a line buffers memory 16. The line buffers memory 16 comprises a plurality of storage sites for storing a plurality of lines of pixel data. As shown in FIG. 1, the line buffers memory 16 comprises N lines of storage. As each pixel of data is received by the line buffers memory 16, it is stored first in the first line delay 16$a$. The pixel is then propagated through the first line delay 16$a$ and is stored in the first position of the second line delay 16$b$, through which it propagates, and so forth. Thus, the output of every line buffers 16$x$, is the grey value of the line of pixels immediately preceding it. In one embodiment, each of the lines of delay 16$x$ in the line buffers memory 16 can be a shift register.

The real-time output of the A to D converter 14 is also supplied to a white maximum follower circuit 18 (shown in greater detail in FIG. 5$a$) and simultaneously to a black minimum follower circuit 20 (shown in greater detail in FIG. 5$b$).

The white maximum follower circuit 18 receives each pixel from the A to D converter 14 and produces the maximum or the highest grey scale value. At each horizontal position, the white maximum follower circuit 18 finds the highest white grey scale value among the input pixels, and produces this at its output. The white maximum value so determined is supplied on the output 19.

Similarly, the black minimum follower circuit 20 produces the lowest grey scale value. The black minimum value so determined is supplied on the output 21.

The instantaneous white maximum value and the instantaneous black minimum value are supplied to the maximum and minimum detector circuit 24 and to the white maximum store 26 and black minimum store 28, respectively.

The maximum detector portion of the maximum and minimum detectors circuit 24 reads each pixel of the white maximum value and determines if the maximum value located on that line is associated with a light/dark boundary (or an edge). In one embodiment, the maximum and minimum detectors 24 reads each pixel value to determine if a plurality of successive pixels have white maximum values which become successively more white. At the end of such a succession, a sample pulse is generated to store that white maximum value in the white maximum store 26. Thus, the white maximum value is defined as the white maximum value on one side of an edge. In this manner, noise and other unimportant variations do not cause incorrect white maximum values to be detected.

Similarly, the black minimum value is supplied to the maximum and minimum detectors circuit 24. The minimum detector portion of the maximum and minimum detectors circuit 24 reads the black minimum value and determines the black minimum value when a plurality of successive black minimum pixels are determined with a subsequent decrease in the pixel value denoting the crossover of an edge. Thus, the black minimum value is on the "black side" of an edge. The black value determined in this matter is then stored in a black minimum storage 28. Collectively, the white max follower 18, the black min follower 20, and the max and minimum detector 24 may be viewed as comprising one or more edge detectors 23.

In an improvement to the apparatus 10, the white maximum store 26 and the black minimum store 28, averages the newly received value with the previously stored value and stores that as the new value.

The threshold calculator circuit 30 (shown in greater detail in FIG. 5(d)(1) or FIG. 5(d)(2) receives the output of the white maximum storage 26 and the black minimum storage 28. In addition, the threshold calculator circuit 30 receives a user selectable threshold input which is expressed as a percentage of the difference between the white maximum storage 26 and the black minimum storage 28. The output of the threshold calculator circuit 30 is a threshold level 31, which is supplied to a comparator 32. The threshold calculator 30 will be described in greater detail hereinafter.

After the first pixel of the first line has shifted through the line buffers memory 16 by a preset number of lines of delay, it is then supplied to the middle line 34 and is outputted from the line buffers memory 16. The middle line 34 is supplied to a pixel delay 40. The pixel delay 40 is a storage area which delays a fixed number of pixels in order to permit the apparatus 10 of the present invention to "look ahead" from the pixel that is being currently the subject of the threshold by the comparator 32. This is to permit the threshold level for a place on the image to be set, before the pixels in that place are supplied to the comparator 32. From the pixel delay 40, the grey scale value of the pixel is then supplied to the comparator 32. The grey scale value of a pixel supplied to a comparator 32 is compared to the threshold level 31 from the threshold calculator circuit 30. In the event the grey scale value exceeds the threshold level 31, a binary "one" representing white is the output. In the event the grey scale value is less then the threshold level 31, the comparator 32 outputs a binary "zero" representing black. Thus, the output of the comparator 32 is a binary video signal 42.

Figure 2:
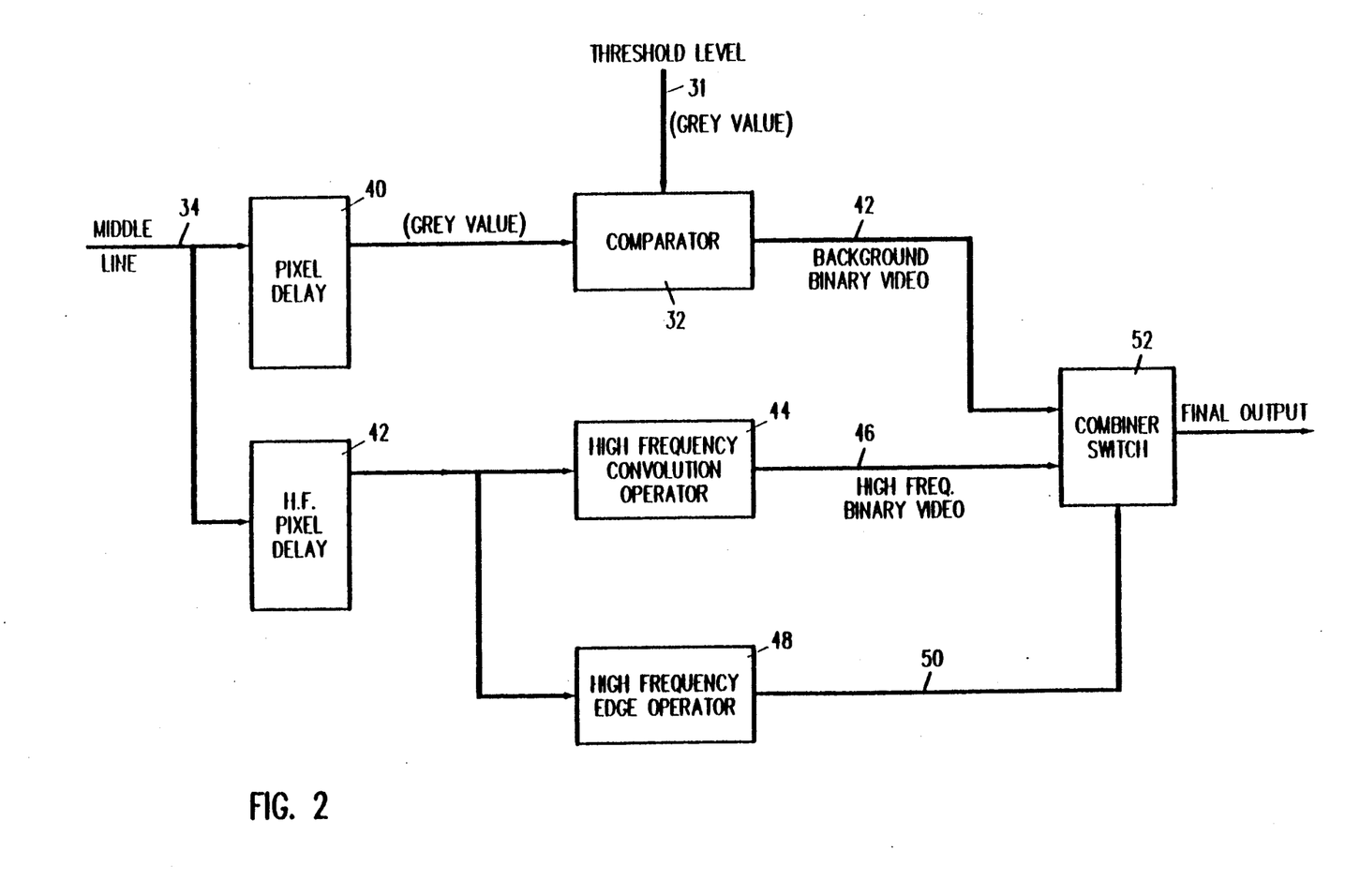
FIG. 2 is a schematic diagram of a portion of another embodiment which is an improvement to the apparatus of the present invention.

Referring to FIG. 2, there is shown a portion of a circuit which, when used in the apparatus 10 shown in FIG. 1, is an improvement to the apparatus 10. FIG. 2 shows the middle line 34 being supplied to a pixel delay 40 which supplies the grey scale value of the pixel to the comparator 32. The threshold level 31 from the threshold calculator circuit 30 is also supplied to the comparator 32. The output of the comparator 32 is the video binary signal 42. In the embodiment shown in FIG. 2, the video binary signal 42 from the comparator 32 shall be called the "background binary video signal 42".

The middle line 34 is also supplied to a high frequency pixel delay circuit 42. The high frequency pixel delay circuit 42, like the pixel delay 40 delays the pixels by a fixed length. The output of the high frequency pixel delay 42 is supplied to a high frequency convolution operator 44 and a high frequency edge operator 48. In fact, the output of the pixel delay 40 can be supplied to the high frequency convolution operator 44 and to the high frequency edge operator 48.

The high frequency convolution operator 44 is a foreground processor, which helps to correct for the blurring of the optics and electronics in the camera 16 and helps to exactly determine the proper position of a black/white transition. The output of the high frequency operator 44 is a video binary signal which is usually termed "foreground signal".

The high frequency convolution operator 44 is for small, sharp features, and is used generally in areas where relatively sharp edges can be easily found. The high frequency convolution operator 44 is used to maximize the contrast in a small area around the pixel in question. In contrast, the background areas of the image as processed by the apparatus 10 of the present invention, produces a background video signal 42 which is in areas where no sharp edges exist or none can be easily found. Thus, a threshold different from the threshold for foreground processing is usually used.

The circuit shown in FIG. 2 is a "one dimensional" high frequency convolver, since only the middle line 34 is supplied as a source. Therefore, the "surround" pixels are only the pixels to the left and to the right of the center pixel. Most high frequency convolvers use multiple lines as input (2-dimensional) and therefore can use the pixels in the vertical dimension as well, for the comparison "surround" value.

In the embodiment shown in FIG. 2, The high frequency convolution operator 44 does not have any threshold value 31 supplied thereto. It uses the pixel values of the surrounding pixels to determine the threshold value. The output of the high frequency convolution operator 44 is a high frequency binary video signal 46 which is continually changing, showing as black or white output with a slightest change in level from pixel to pixel. Because it is such a sensitive and noisy signal, it cannot be used as the only output because it is continually switching between black and white, even in areas that the eye perceives as uniform.

The high frequency binary video signal 46 is supplied to a combiner switch 52. The background binary video signal 42 is also supplied to the combiner switch 52. The combiner switch 52 outputs either the background binary video signal 42 or the high frequency binary video signal 46. The switch between the background binary video signal 42 and the high frequency binary video 46 is made by the high frequency edge operator 48 generating a switch signal 50.

When the high frequency edge operator 48 determines that the pixel of interest is sufficiently close to a well defined edge, or that an edge has been detected, then the output of the high frequency convolution operator 44, the high frequency binary video signal 46 can safely be used as the output of the apparatus 10 of the present invention. In the event no edge is detected by the high frequency edge operator 48, the switch signal 50 is not present and the output of the combiner switch 52 is the background binary video signal 42.

There are many examples of the high frequency convolution operator 44. One example is shown in U.S. Pat. No. 4,501,016. Another example is a Laplacian operator, which compares the pixel of interest to an average or waited average of the close neighboring pixels. The method of generating the high frequency binary video signal 46 from a high frequency operator 44 is well known in the art.

The high frequency edge operator 48 simply detects the presence of an edge in the image near the pixel of interest and serves to switch the combiner switch 52. There are many well known prior art circuits which can perform this function.

One prior art high frequency edge operator 48 determines the slope, or the "first derivative" of the video signal in one or more axis. Although this type of operator 48 can be used in the apparatus 10 of the present invention, it has the disadvantage of being too sensitive to signals the eye considers noise and not sensitive enough to features that the eye considers to be true edges.

Figure 3:
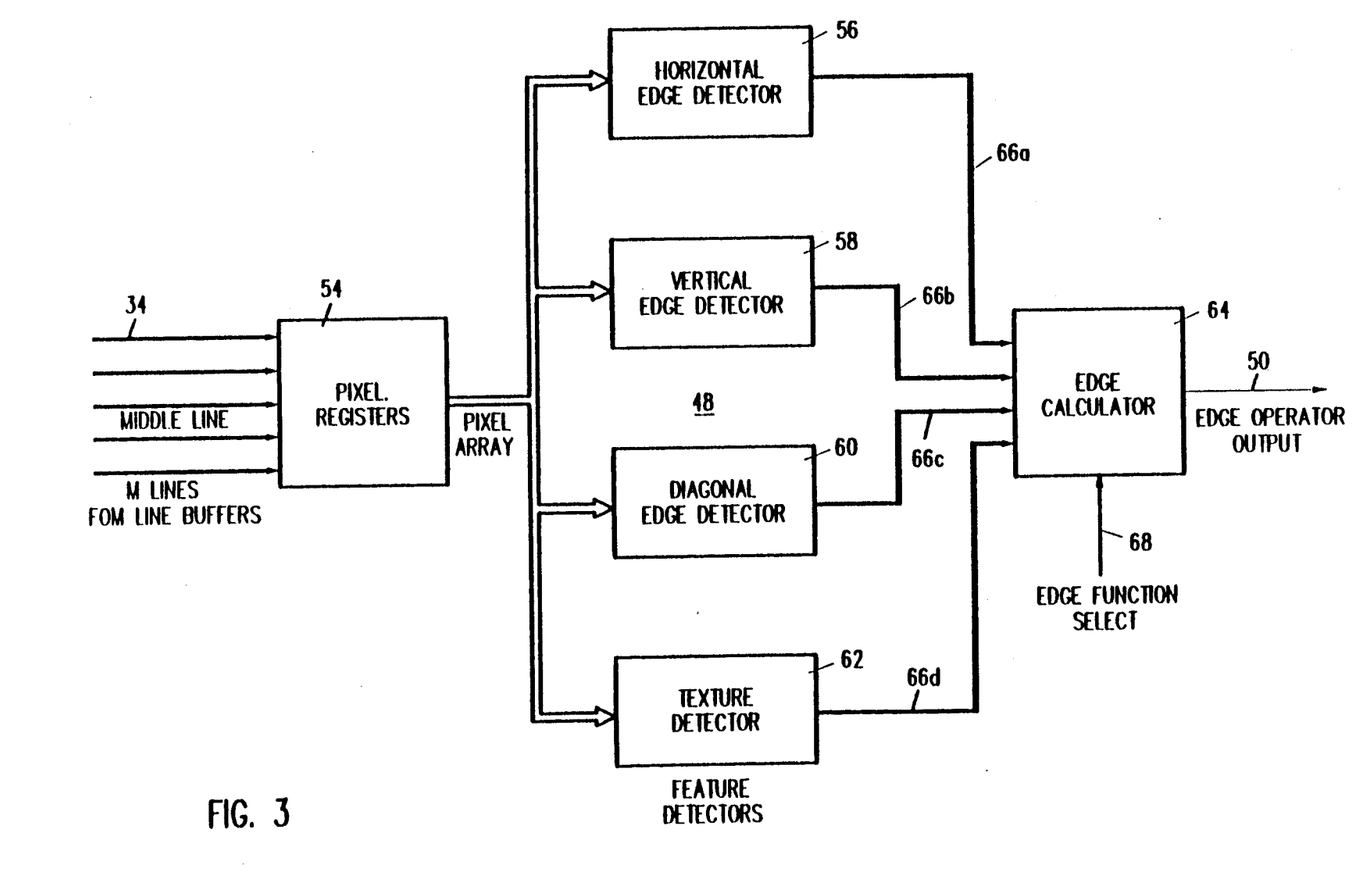
FIG. 3 is a detailed schematic diagram of the high frequency edge operator shown in FIG. 2.

Referring to FIG. 3, there is shown in greater detail one embodiment of a high frequency edge operator 48, for use in the apparatus 10. A plurality of lines 34 from the line buffers memory 16 are supplied to a buffer of pixel registers 54, thereby storing a two-dimensional array of pixels in the pixel registers 54. The data from the pixel array registers 54 is then supplied simultaneously to a plurality of edge detectors such as a horizontal edge detector 56, a vertical edge detector 58, a diagonal edge detector 60 and a texture detector 62. The outputs of the horizontal edge detector 56, vertical edge detector 58, diagonal edge detector 60, and the texture detector 62 are supplied to an edge calculator 64. Each of the edge detectors 56, 58, and 60 supplies an edge detection signal 66(a-d), respectively when the edge detector (56, 58, or 60) has detected an edge in the pixel array stored in the pixel registers 54.

Thus, the horizontal edge detector 56 would output an edge detection signal 66a if it detects a horizontal edge in any of the lines within the pixel registers 54. Similarly, a vertical edge detector 58 would output an edge detection signal 66b if it detects a vertical edge in the pixel array stored in pixel registers 54. Similarly, a diagonal edge detector 60 would an output an edge detection signal 66c if within the pixel array stored in the pixel registers 54, the diagonal edge detector detects an edge in the diagonal direction. Finally, the texture detector 62 outputs a signal 66d which serves to inhibit a false edge generation.

The plurality of edge detection signals 66(a...d) are supplied to the edge calculator 64. The edge calculator 64 also receives a user selectable input 68 for the edge function which the user selects. In response to the edge function select input 68, the edge calculator 64 outputs the appropriate edge detection signal 50, which is supplied to the combiner switch 52.

Thus, for example, if within the image, the user is interested in only horizontal edge detections then the user edge function selection is set to horizontal edge detection. The edge calculator 64 supplies an edge operator output signal 50 only if the horizontal edge detector 56 detects a horizontal edge crossing within the pixel registers 54. A horizontal edge detection would be useful to find edges of text in an image.

Figure 4:
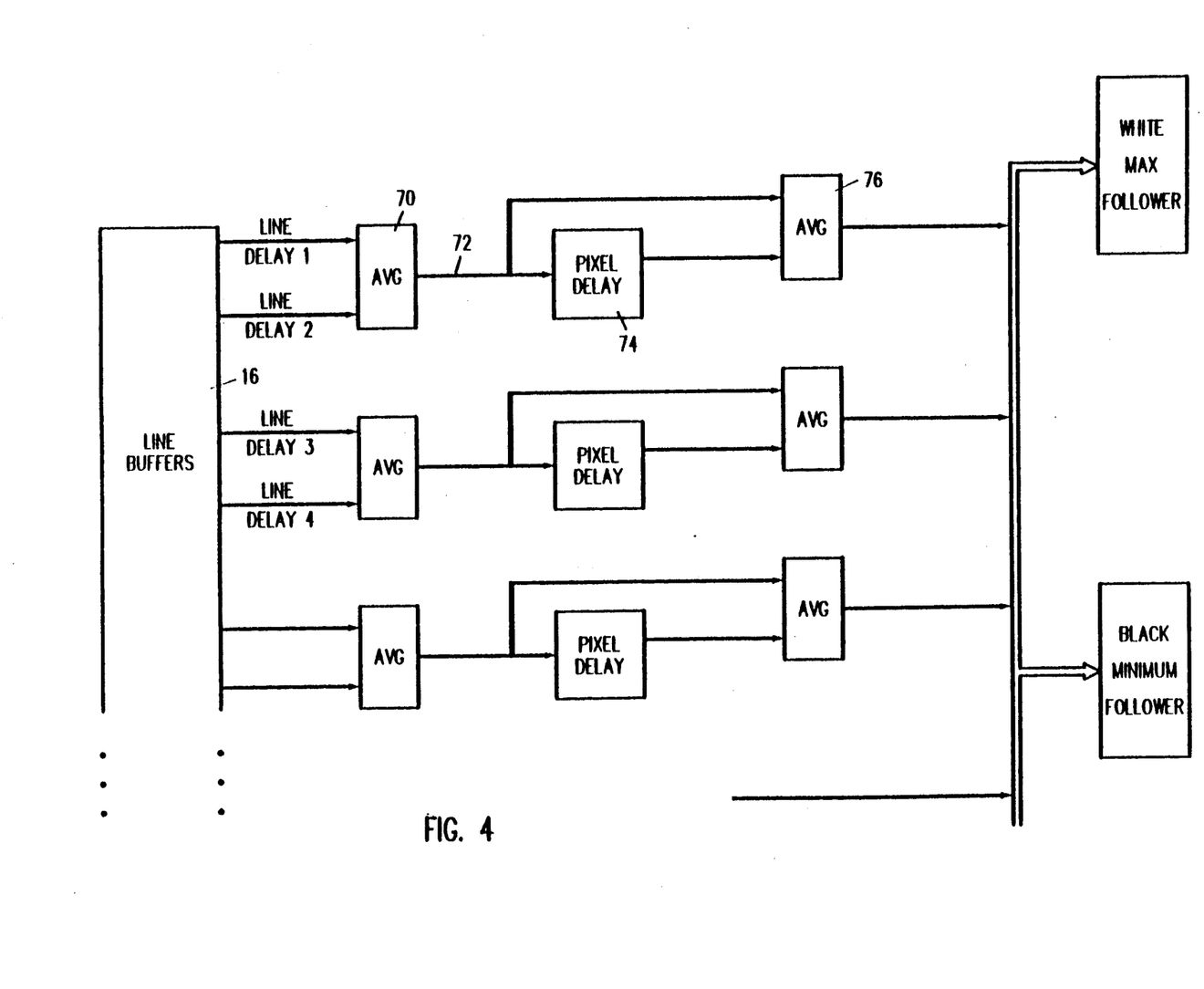
FIG. 4 is a schematic diagram of a portion of yet another embodiment of the apparatus of the present invention.

Referring to FIG. 4, there is a shown a portion of another embodiment of the apparatus 10 of the present invention. Each line from the line buffers memory 16 is averaged with an adjacent line. Thus, as shown in FIG. 4, the output of the first line delay 16a and the second line delay 16b are both supplied to an average circuit 70 which produces an average line 72. Within the average line 72, adjacent pixels are averaged by average circuit 76 which averages the delayed pixel from the pixel delay 74 and current pixel. Similar operations are carried out for successive pairs of lines of delay such as line 3 and line 4, line 5 and line 6, etc.

The filtering of lines from the line buffers memory 16 serves to average the image in one or two dimensions before the pixel values are used to find the white peak maximum value and the black minimum value.

Although the circuit shown in FIG. 4 averages a pixel with its vertical neighbor (average circuit 70) and with its horizontal neighbor (average circuit 76), the invention can be practiced by averaging a pixel only with its vertical neighbor, or only with its horizontal neighbor, or any other type of spatial low pass filtering, of which the circuit in FIG. 4 is one example.

Figure 5A:
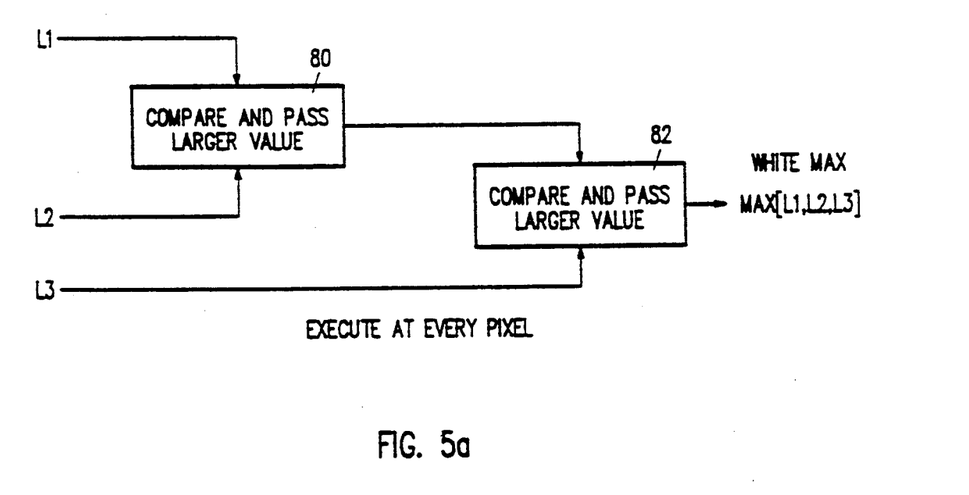

Referring to FIG. 5(a), there is shown a schematic diagram of the White Max Follower circuit 18. In the example shown in FIG. 5(a), the White Max Follower circuit 18 receives three lines of pixels from the line buffers memory 16: The first line (L1) from the real time output of the A-to-D converter 14, the middle line (L2), and line delay N (L3). Each line has a plurality of pixels with each pixel having a different grey scale value. Thus, at any one point in time, three pixels, representing three different grey scale values, are supplied to the white max follower circuit 18. At each point in time, the pixel from L1 is compared to the pixel from L2 by the first compare-and-pass larger value circuit 80. The first compare-and-pass larger value circuit 80 outputs the grey scale value which is the larger of the two from the lines L1 and L2. The output of the first compare-and-pass larger value circuit 80 is supplied to a second compare-and-pass larger value circuit 82, which receives at its other input the pixel from line L3. The output of the second compare-and-pass larger value circuit 82 produces the pixel value which is the largest of the three pixels from the lines L1, L2 and L3. Thus, the white max follower circuit 18 outputs a line of grey values, such that each grey value is the maximum at each horizontal point along the scanning line.

In like manner, the black minimum follower circuit 20 receives the plurality of pixel values from the lines L1, L2 and L3 and produces a line of grey scale values which is the local vertical minimum at each horizontal point along the scanning line. This is accomplished by the circuit shown in FIG. 5(b), wherein the pixels from lines L1 and L2 are supplied to a first compare-and-pass smaller value circuit 84, whose output is supplied to a second compare-and-pass smaller value circuit 86. The pixel values from line L3 is also supplied to the second compare-and-pass smaller value circuit 86 with the output thereof being the output of the black minimum follower circuit 20.

Figure 5B:
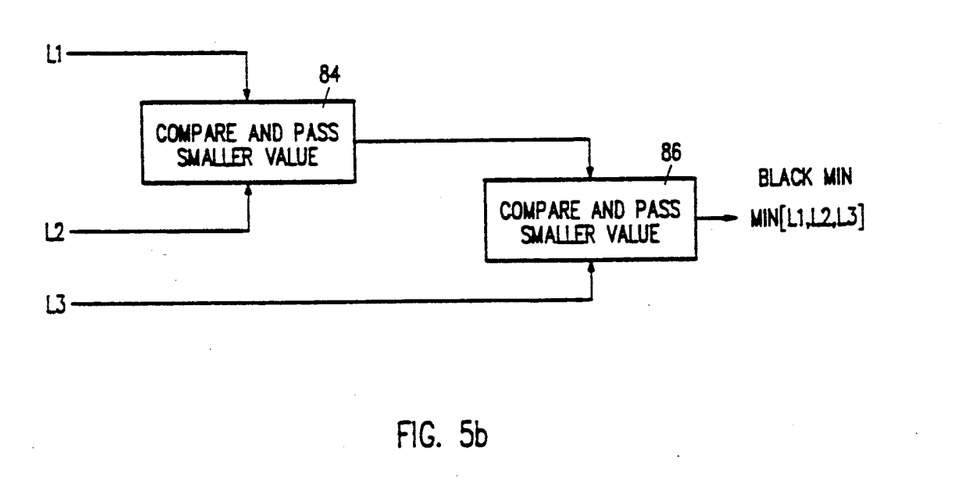

It should be appreciated that the white max follower circuit 18 and/or the black minimum follower circuit 20 can receive more than three lines and produce the maximum and minimum grey values accordingly.

Figure 5C:
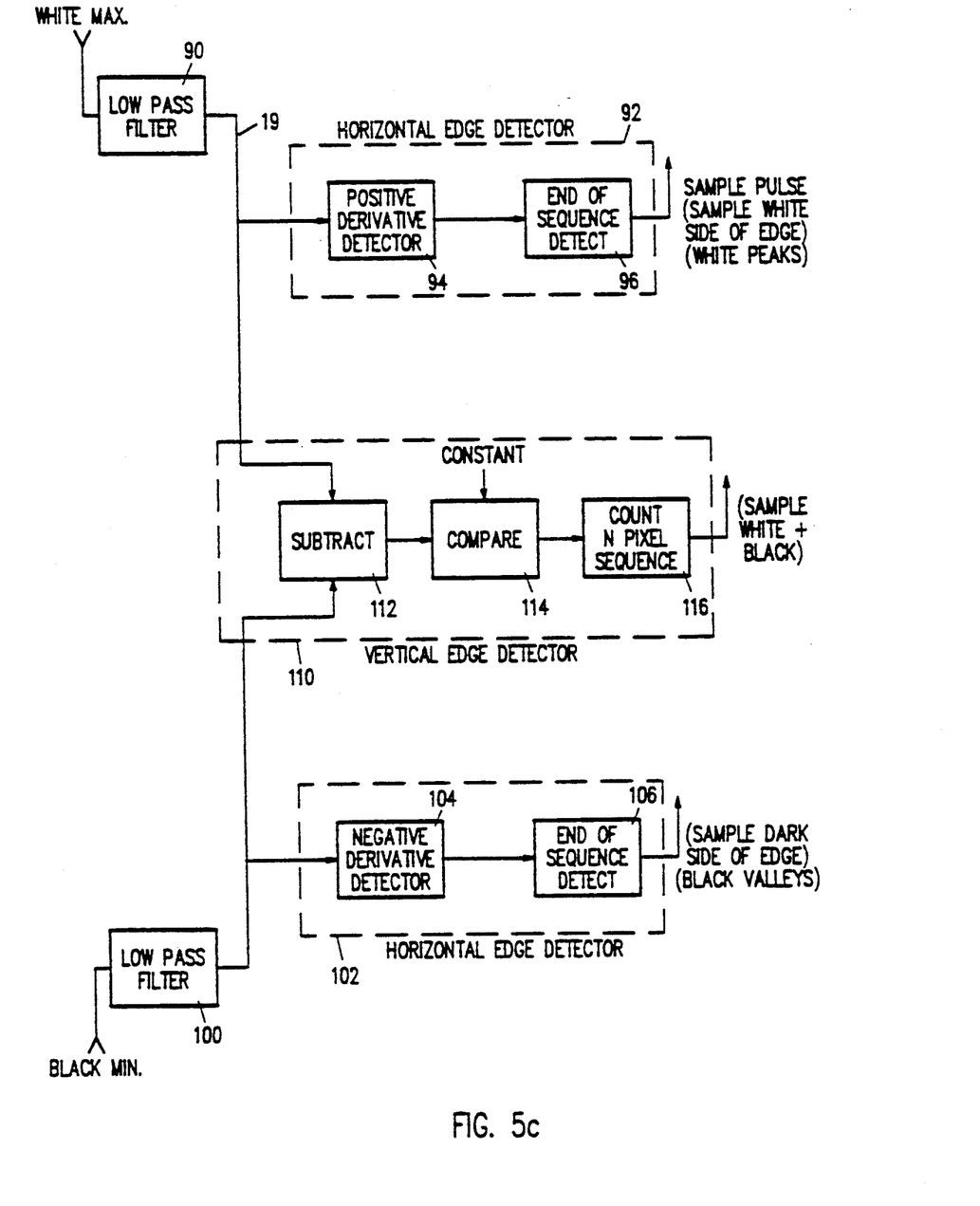
Figure 5D:
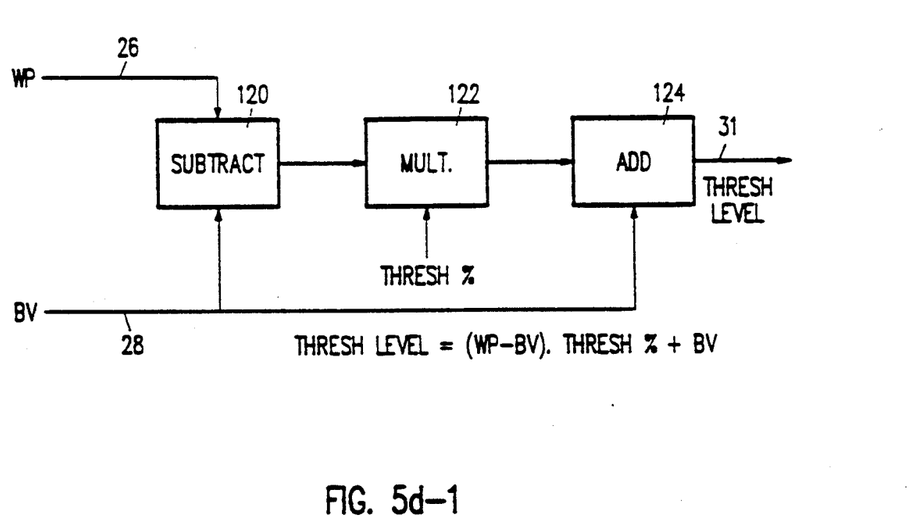
Figure 5D:
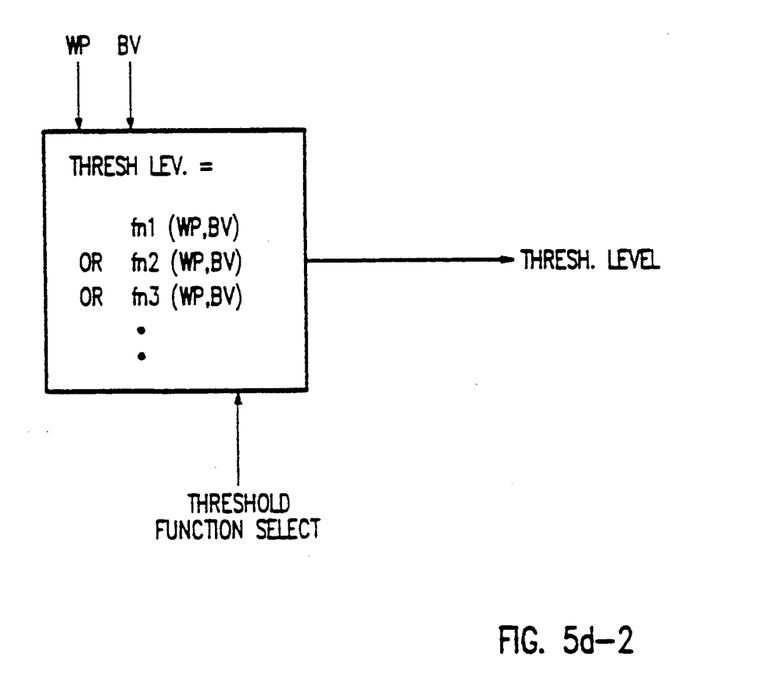
Figure 5E:
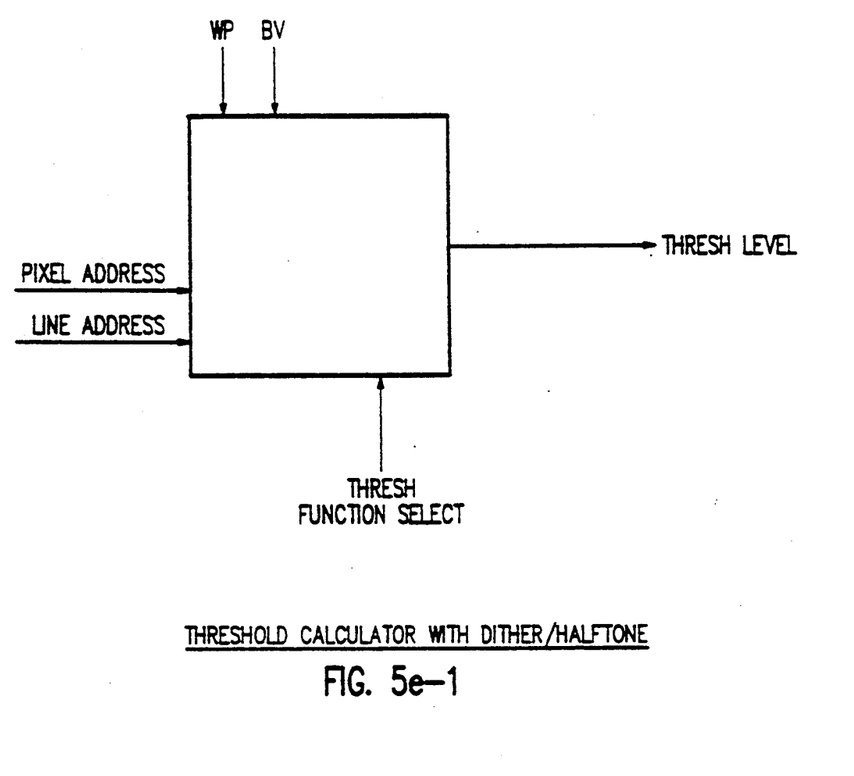
Figure 5E:
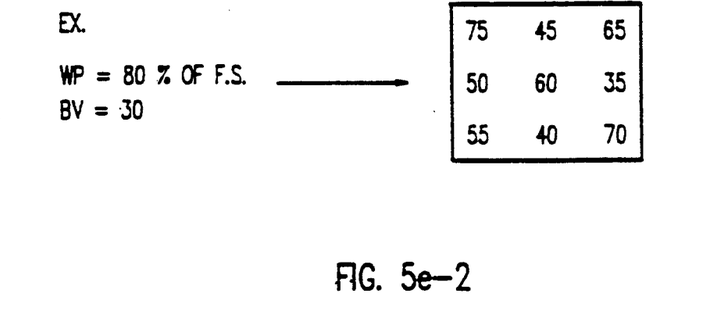

Referring to FIG. 5(c), there is shown a schematic diagram of the max and minimum detectors circuit 24. In the embodiment shown in FIG. 5(c), the white max values 19 from the white max follower circuit 18 are first supplied to a low-pass filter 90 which removes noise and also broadens an edge with usually the larger or higher edges becoming broader. This allows the width of the edge (the number of pixels increasing or decreasing) to be a rough measure of the size of the edge. From the low-pass filter 90, the white max values 19 are then supplied to a horizontal edge detector 92 which comprises a positive derivative detector 94 and an end of sequence detector 96. The positive derivative detector 94 detects when the white max values 19 are increasing. The end of sequence detector circuit 96 detects when the sequence of white max values 19 have stopped increasing (i.e., the end of the sequence represents an edge). Upon the detection of a horizontal edge, the end of sequence detector circuit 96 generates a sample pulse which causes the particular white max value 19 to be stored in the white max stored store 26.

Similarly, the plurality of black minimum values 21 are first passed through a low-pass filter 100 and are then supplied to a second horizontal edge detector 102. The second horizontal edge detector 102 comprises a negative derivative detector 104 with an end of sequence detector 106. In like manner, the low-pass filter 100 serves to remove noise and also broaden an edge from the black minimum values 21. The negative, derivative detector 104 detects when the black minimum values 21 decreases. The end of sequence detector 106 detects when the sequence of decreasing black minimum values 21 have ceased to decrease. At that point, the end of sequence detector 106 generates a sample pulse which causes the particular black minimum value 21 to be stored in the black minimum store 28.

The white max value 19 and the black minimum value 21 are also supplied to a vertical edge detector 110. The vertical edge detector 110 comprises a subtractor 112, a comparator 114, and a count N pixel sequence circuit 116. A difference between the white max value 19 and the black minimum value 21 is first made by the subtractor 112. The output of the subtractor 112 is supplied to the comparator 114 to which a constant is also supplied as the input thereof. If the difference lasts for a number of pixels, as determined by the count N pixel sequence circuit 116, then a sample pulse is generated by the count N pixel sequence 116 which causes both the white max value 19 and the black minimum value 21 to be stored in the white max store 26 and the black minimum store 28, respectively.

Referring to FIG. 5(d), there is shown a schematic block diagram of one embodiment of the threshold calculator 30. The values stored in the white max store 26 and the black minimum store 28 are both supplied to a subtractor 120. From the subtractor 120, the result is passed to a multiplier 122 to which the user selectable threshold percentage value is also supplied. The output of the multiplier 122 is supplied to an adder 124 to which the black value from the black minimum store 28 is also supplied. The output of the adder 124 is the threshold level 31. Thus, the threshold level 31 is calculated as follows:

Threshold level=(white max−black min) *thres percentage+black min.

In one embodiment the user selectable threshold input is constant during a scan. Of course, that user selectable threshold input can be changed during the scan affording dynamic adjustment of the threshold percentage 31.

Referring to FIG. 5(d-2), there is shown a block diagram of a more generalized threshold calculator 30 which allows the threshold value 31 to be any function of the white max value stored in the white max store 26 and the black min value stored in the black min store 28. A particular function is selected by the user by the threshold function select. All of the functions of the simpler threshold calculator 30 are a subset of the functions possible in this implementation. A typical function might be one that produces a threshold value 31 that was close to the black min value when both white max and black min are low and close to white max when both are high. The threshold value 31 could remain equally distant between the two values for all other values. The effect of such a type of setting would be to produce a threshold image that was lighter in the darker areas and darker in the lighter areas of the scanned image. This type of calculator can be implemented by means of a Read-Only Memory (ROM) look-up table, wherein the threshold level 31 can be specified for every possible combination of input values from the white max store 26, black min store 28 and threshold function select.

Referring to FIG. 5(e), there is shown another variation of the threshold calculator 30, with dither or half-tone capability. In general the use of dither or half-tone patterns to represent grey images is well-known in the art. The threshold calculator 30 receives the white max value, the black min value, the threshold functions select and, in addition, the pixel address and the line address. In almost all applications of dither or half-tone, the pattern of threshold values stays fixed for the whole image. By using the white max and black min values as inputs to a dither threshold calculator 30, a more efficient use of the dither values can be made, for example, by spreading them between the white max and the black min values dynamically.

Figure 6:
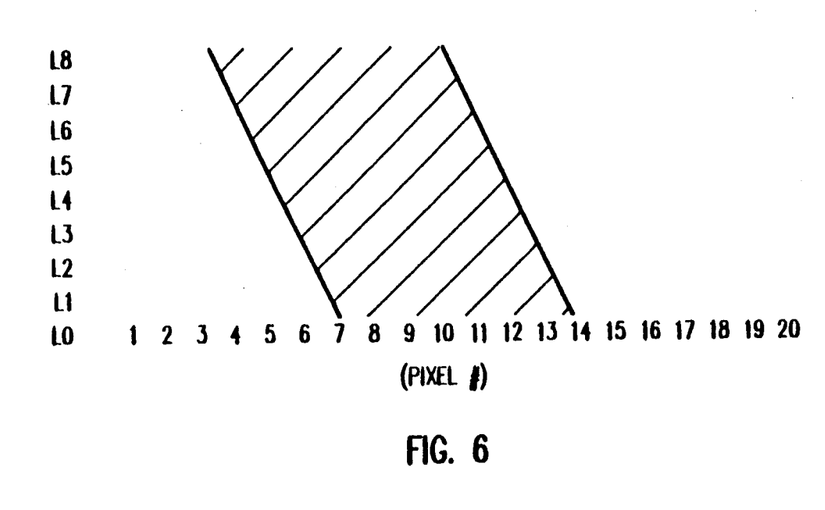
FIG. 6 is an example of an image digitized with the present invention.

Referring to FIG. 6, there is shown an example of an image having nine lines (L0–L8) with each line having twenty pixels, with the image having a blurred dark line approximately five pixels wide spanning lines L0 to L8. The result of the direction of scan produces the three line delays having the following grey scale values between the values 0 to 10 where 10 is white and 0 is black.

|    | Values |    |    |    |    |    |    |    |    |    |    |    |    |    |    |    |    |    |
|----|--------|----|----|----|----|----|----|----|----|----|----|----|----|----|----|----|----|----|
| L8 | 10 | 10 | 10 | 8  | 5  | 2  | 2  | 2  | 4  | 9  | 10 | 10 | 10 | 10 | 10 | 10 | 10 | 10 |
| L4 | 10 | 10 | 10 | 10 | 8  | 5  | 2  | 2  | 2  | 2  | 4  | 9  | 10 | 10 | 10 | 10 | 10 | 10 |
| L0 | 10 | 10 | 10 | 10 | 10 | 10 | 10 | 8  | 5  | 2  | 2  | 2  | 4  | 9  | 10 | 10 | 10 | 10 |

The ouptut of the white max follower circuit 18 (WM) and the lack minimum follower circuit 20 (BM) would be the following pixel values:

|    | Values |    |    |    |    |    |    |    |    |    |    |    |    |    |    |    |    |    |
|----|--------|----|----|----|----|----|----|----|----|----|----|----|----|----|----|----|----|----|
| WM | 10 | 10 | 10 | 10 | 10 | 10 | 10 | 8  | 5  | 9  | 10 | 10 | 10 | 10 | 10 | 10 | 10 | 10 |
| BM | 10 | 10 | 10 | 10 | 5  | 2  | 2  | 2  | 2  | 2  | 2  | 2  | 4  | 9  | 10 | 10 | 10 | 10 |

The max and minimum detectors 24 receives the output of the white max follower circuit 18 and the black minimum follower circuit 20 and generates a sample pulse causing the following indicated values to be stored in the white max store 26 (WS) and the black min store 28 (BS), respectively.

|    | Values |   |   |   |   |   |   |   |   |   |    |    |    |    |    |    |    |    |
|----|--------|---|---|---|---|---|---|---|---|---|----|----|----|----|----|----|----|----|
| WS | X | X | X | X | X | X | X | X | X | X | X  | 10 | 10 | 10 | 10 | 10 | 10 | 10 | 10 |
| BS | X | X | X | X | X | X | 2 | 2 | 2 | 2 | 2  | 2  | 2  | 2  | 2  | 2  | 2  | 2  | 2  | where X is the value previously stored in store 26 and 28, respectively.

If we assume the threshold percentage is set at fifty percent (50%), then the result of the threshold calculator 30, the threshold level 31 (TV) would have the following value:

TV X X X X X X X X X X X 6 6 6 6 6 6 6 6 where X is the prior stored value.

The middle line 34 is delayed by eight pixels by the pixel of delay 40 resulting in the following values:

L4 X X X X X X X 10 10 10 10 10 8 5 2 2 2 4 9 where X is the prior value.

The binary video signal 42, (BV) which is the output of the comparator 32 would then have the following values:

BV X X X X X X X X X X X W W W B B B B W where B is black and W is white.

As can be seen from the foregoing, the method and apparatus of the present invention has many advantages. First and foremost is that the determination of the threshold level is based upon detection of maximum white peak value and minimum black value, associated with an edge or edges. Further, these values may not necessarily be proximate to the pixel of interest. Finally, by having the threshold as a user selectable input, the threshold can be dynamically changed and yet be insensitive to noise and slightest pixel value change as in a high frequency operator.

What is claimed is:

1. An apparatus for dynamically setting a discrimination threshold for the processing of an image having one or more edges said image is composed of a plurality of lines, each having a plurality of pixels, each pixel having a grey value, said apparatus comprising:

means for receiving a plurality of said lines of pixels;

means for determining the pixel ("instantaneous maximum pixel") having the maximum grey value among the plurality of pixels received;

means for receiving said instantaneous maximum pixel and for storing its grey value in the event said instantaneous maximum pixel is associated with one of said edges of said image;

means for determining the pixel ("instantaneous minimum pixel") having the minimum grey value among the plurality of pixels received;

means for receiving said instantaneous minimum pixel and for storing its grey value in the event said instantaneous minimum pixel is associated with one of said edges of said image;

means for setting a grey scale threshold based upon the stored minimum grey value and the stored maximum grey value; and means for comparing the grey value of each pixel of said image to said grey scale threshold to produce a first binary output for each pixel.

2. The apparatus of claim 1 wherein said setting means is responsive to a user selectable input to set the grey scale threshold between the stored minimum grey value and the stored maximum grey value based upon said user selectable input.

3. The apparatus of claim 2 wherein said setting means further comprises:

means for subtracting the stored minimum grey value from the stored maximum grey value to produce a difference value;

means for multiplying said difference value by said user selectable input expressed as a percentage to produce an intermediate value; and means for summing said intermediate value to said stored minimum grey value to produce said grey scale threshold.

4. The apparatus of claim 1 further comprising means for delaying said pixels prior to being supplied to said comparing means.

5. The apparatus of claim 1 further comprising means for filtering said pixels prior to being supplied to the determining means.

6. The apparatus of claim 1 further comprising:

means for generating a high frequency binary output for each pixel;

means for receiving said first binary output and said high frequency binary output; and means for detecting an edge and for switching the output of said apparatus between said first binary output and said high frequency binary output, in response to said edge detected.

7. The apparatus of claim 6 wherein said means for detecting an edge further comprises:
a plurality of different types of edge detecting means, each for generating an output upon the detecting of an edge different from the other;
means for receiving the plurality of outputs from the different types of edge detecting means; said receiving means also responsive to a user selectable input for switching the output of said apparatus in response to said user selectable input selecting one of said type of edge detecting means.

8. A method of generating a video binary signal for a video image having one or more edges, said image having a plurality of lines each having a plurality of pixels with each pixel having a grey scale value, said method comprising:
receiving a plurality of lines of pixels;
determining the first pixel having the maximum grey value among the plurality of pixels received;
storing the maximum grey value determined in the event the first pixel determined is associated with one of said edges of said image;
determining the second pixel having the minimum grey value among the plurality of pixels received;
storing the minimum grey value determined in the event the second pixel determined is associated with one of said edges of said image;
setting a grey scale threshold based upon the stored minimum grey value and the stored maximum grey value; and
comparing the grey value of each pixel of said video image to said grey scale threshold to produce said video binary signal.

9. The method of claim 8 wherein said setting step further comprises the steps of:
receiving a user input; and
generating the grey scale threshold between the stored minimum grey value and the stored maximum grey value based upon the user input.

10. The method of claim 9 wherein said generating step further comprising:
subtracting the stored minimum grey value from the stored maximum grey value to produce a difference value;
multiplying said difference value by said user selectable input expressed as a percentage to produce an intermediate value; and
summing said intermediate value to said stored minimum grey value to produce said grey scale threshold.

11. The method of claim 8 further comprising:
delaying the pixels of the image prior to the comparing step.

12. The method of claim 8 further comprising:
filtering the pixels prior to the determining step.

13. The method of claim 8 further comprising:
generating a high frequency binary output signal for each pixel;
receiving the video binary signal and the high frequency binary output signal by a combiner;
detecting an edge in said image; and
switching the output of the combiner between the video binary signal and the high frequency binary output signal in response to the edge detected in the image.

14. An apparatus for dynamically setting a discrimination threshold for the processing of an image having one or more edges, said image is composed of a plurality of lines, each having a plurality of pixels, each pixel having a grey value, said apparatus comprising:
means for receiving a plurality of said lines of pixels;
first means for detecting an edge of said image among the plurality of said lines of pixels;
first means for determining the maximum grey value of the pixels in the region of said edge detected;
second means for determining the minimum grey value of the pixels in the region of said edge detected;
means for storing said minimum and maximum grey values;
means for setting a grey scale threshold based upon the stored minimum grey value and the stored maximum grey value; and
means for comparing the grey value of each pixel of said image to said grey scale threshold to produce a first binary output for each pixel.

15. The apparatus of claim 14 further comprising:
means for generating a high frequency binary output for each pixel;
means for receiving said first binary output and said high frequency binary output; and
second means for detecting an edge and for switching the output of said apparatus between said first binary output and said high frequency binary output in response to said edge detected by said second detecting means.

16. The apparatus of claim 15 wherein said second means for detecting an edge further comprises:
a plurality of different types of edge detecting means, each for generating an output upon the detecting of an edge different from the other; and
means for receiving the plurality of outputs from the different types of edge detecting means; said receiving means responsive to a user selectable input for switching the output of said apparatus in response to said user selectable input selecting one of said type of edge detecting means.

17. The apparatus of claim 14 wherein said edge detected has a first side having light grey values associated therewith, and a second side, having dark grey values associated therewith.

18. The apparatus of claim 17 wherein said first determining means determines the maximum grey value of the pixels on said first side and said second determining means determines the minimum grey value of the pixels on said second side.

19. The apparatus of claim 14 wherein said setting means comprises a plurality of different means for calculating said grey scale threshold and wherein said setting means is further responsive to a user selectable input to select one of said calculating means to calculate said grey scale threshold.

* * * * *